(12) United States Patent
Rank et al.

(10) Patent No.: US 8,893,870 B2
(45) Date of Patent: Nov. 25, 2014

(54) DUAL CLUTCH

(75) Inventors: Robert Rank, Arnsberg (DE); Matthias Glomm, Iserlohn (DE); Christian Hampel, Unna (DE); Thomas Haeseker, Lauterhofen (DE)

(73) Assignee: GKN Stromag AG, Unna (DE)

( * ) Notice: Subject to any disclaimer, the term of this patent is extended or adjusted under 35 U.S.C. 154(b) by 0 days.

(21) Appl. No.: 13/824,569

(22) PCT Filed: Aug. 18, 2011

(86) PCT No.: PCT/EP2011/064204
§ 371 (c)(1),
(2), (4) Date: May 16, 2013

(87) PCT Pub. No.: WO2012/038159
PCT Pub. Date: Mar. 29, 2012

(65) Prior Publication Data
US 2013/0220761 A1 Aug. 29, 2013

(30) Foreign Application Priority Data

Sep. 20, 2010 (DE) .......................... 10 2010 046 633

(51) Int. Cl.
| | | |
|---|---|---|
| *F16D 25/10* | (2006.01) | |
| *F16D 25/0638* | (2006.01) | |
| *F16D 21/02* | (2006.01) | |
| *F16D 25/12* | (2006.01) | |
| *F16D 21/06* | (2006.01) | |

(52) U.S. Cl.
CPC ............ *F16D 21/02* (2013.01); *F16D 25/0638* (2013.01); *F16D 25/10* (2013.01); *F16D 25/12* (2013.01); *F16D 2021/0661* (2013.01)
USPC .................... 192/48.611; 192/48.8; 192/85.41

(58) Field of Classification Search
CPC ................. F16D 2021/0615; F16D 2021/0607
USPC .......................................... 192/48.611, 48.91
See application file for complete search history.

(56) References Cited

U.S. PATENT DOCUMENTS 2,953,034 A 9/1960 Weaver
3,157,057 A * 11/1964 Palmer et al. ................... 74/378
(Continued)

FOREIGN PATENT DOCUMENTS

DE 10596 A 9/1880
EP 1 686 277 A1 8/2006

OTHER PUBLICATIONS

Form PCT/ISA/220 Notification of Transmittal of International Search Report dated Nov. 8, 2011 (1 page).

(Continued)

*Primary Examiner* — Troy Chambers
*Assistant Examiner* — Lillian Nguyen
(74) *Attorney, Agent, or Firm* — Flynn, Thiel, Boutell & Tanis, P.C.

(57) ABSTRACT

A dual shift coupling including two operatively connected coupling units mounted on a shared, integrally formed inner body in a rotationally fixed and axially movable manner. Further, a multi-part pressure disk is arranged between the coupling units in an axially fixed manner and is supported by the inner body, and has two axially movable pressure pistons ventilated by respective pressure spring assemblies arranged in the inner body. A radial notch for accommodating the pressure disk is provided in the inner body, wherein the radial depth of the notch extends at least to radial inner wall segments of recesses for the pressure spring assemblies. Each pressure spring assembly has a plurality of pressure springs which rest on the inner side of the pressure disk relative to the axis.

20 Claims, 2 Drawing Sheets

(56) References Cited

U.S. PATENT DOCUMENTS

| | | | |
|---|---|---|---|
| 4,044,869 A * | 8/1977 | Gros | 192/48.91 |
| 4,947,974 A * | 8/1990 | Smemo et al. | 192/48.611 |
| 5,031,739 A * | 7/1991 | Flotow et al. | 192/13 R |
| 6,394,246 B1 * | 5/2002 | Gassmann et al. | 192/35 |
| 8,413,782 B2 * | 4/2013 | Amano et al. | 192/85.29 |
| 2004/0206599 A1 * | 10/2004 | Hegerath | 192/87.11 |
| 2005/0082136 A1 * | 4/2005 | Braford et al. | 192/48.91 |
| 2005/0279606 A1 * | 12/2005 | Heinrich | 192/48.91 |
| 2006/0042909 A1 * | 3/2006 | De Maziere | 192/87.11 |
| 2009/0084652 A1 * | 4/2009 | Kummer et al. | 192/113.1 |

OTHER PUBLICATIONS

Form PCT/ISA/210 International Search Report with English translation of categories of documents cited dated Nov. 8, 2011 (5 pages).

Form PCT/ISA/237 Written Opinion of International Searching Authority dated Nov. 8, 2011 (7 pages).

Stromag Article: "Hydraulisch geschaltete Lamellenkupplungen fuer Schiffsgetriebe", XP-002662055 dated Jan. 1, 1999 (9 pages).

Examination Report of German Patent Office issued in German Application No. 10 2010 046 633.6 dated Mar. 28, 2011 (5 pages).

* cited by examiner

DUAL CLUTCH

FIELD OF THE INVENTION

The invention relates to a dual clutch having two positively acting clutch units which are mounted in a rotationally fixed and axially movable manner, in relation to a clutch rotational axis, on a common, single-piece inner body, and having a pressure disk which is arranged in an axially fixed manner between the clutch units, is held on the inner body and is of multiple-piece design, and having two axially movable pressure pistons which can be ventilated by means of in each case one compression spring arrangement which is arranged in the inner body.

BACKGROUND OF THE INVENTION

A dual clutch of this type is generally known (KMS catalog from the company Stromag AG). A dual clutch of this type has two positively acting clutch units in the form of multiple disk assemblies which are held on a common and single-piece inner body. A pressure disk is held on the inner body between the multiple disk assemblies. Each multiple disk assembly can be loaded on the side which lies opposite the pressure disk by a hydraulically actuated pressure piston which can be ventilated by compression springs. The compression springs are arranged in blind holes of the inner body, which blind holes are made in the inner body from opposite axial end sides.

OBJECTS AND SUMMARY OF THE INVENTION

It is an object of the invention to provide a dual clutch of the type which is mentioned at the outset, which dual clutch makes simplified production possible.

This object is achieved by virtue of the fact that a radial groove is provided in the inner body in order to receive the pressure disk, the radial depth of which radial groove extends at least as far as radially inner wall sections of cutouts for the compression spring arrangements, and that each compression spring arrangement comprises a plurality of compression springs which are supported axially on the inside on the pressure disk. Simplified production of the cutouts for the compression spring arrangements is made possible by virtue of the fact that the pressure disk is inserted so deeply into the inner body that its opposite axial end faces which are positioned radially inside the outer contour of the inner body can serve to support the compression springs. As a result, the production of the inner body is simplified. This permits inexpensive production of the dual clutch. The dual clutch according to the invention is provided for use in an industrial transmission system, in particular for a drive of an exploration pump for mineral oil extraction. As an alternative, the invention can also be provided in machine tool construction or in commercial vehicle construction or the like. The cutouts can be extended axially beyond the receptacle for the pressure disk by virtue of the fact that the receptacle for the pressure disk and the cutouts for the compression spring arrangements intersect one another in the inner body. The support of the compression springs directly on the pressure disk ensures a flat, radially oriented supporting face which makes an improved action of the compression springs possible.

In one refinement of the invention, the cutouts of axially opposite compression springs of the two compression spring arrangements are aligned axially with one another.

In a further refinement of the invention, all the cutouts which are aligned axially with one another in the inner body are formed in each case by through holes which penetrate the inner body completely axially. These through holes can be drilled axially through the inner body in one work operation. Blind holes are avoided. The through holes can be equipped from both axial end sides of the inner body. This means that two compression springs (one for each clutch unit) which are aligned with one another can be introduced into a single through hole from opposite end sides of the inner body, which compression springs are supported on opposite axial end faces on the common, centrally arranged pressure disk.

In a further refinement of the invention, the pressure disk has at least two pressure disk sections which adjoin one another in the circumferential direction and are connected to one another radially on the outside by a single-piece, circumferential carrier ring. As a result of this refinement, the pressure disk sections are not connected to one another directly, but rather indirectly via the single-piece carrier ring which is circumferential radially on the outside. The multiple-piece design of the pressure disk is necessary, in order to make assembly and dismantling within the radial groove of the inner body possible. The fastening of the pressure disk sections to the single-piece carrier ring ensures a particularly exact radial orientation of the pressure disk sections and particularly high stability and accuracy of fit.

In a further refinement of the invention, the carrier ring comprises a radially inwardly projecting fastening flange, on which the pressure disk sections are held by means of axially acting fastening means. This refinement ensures a particularly stable and low-tolerance, rigidly connected pressure disk form.

Screw connections are provided as fastening means in a particularly advantageous way. In addition to other mechanical fastening means which can be provided according to the invention, the screw connections have the advantage that they represent releasable connections. Corresponding threaded holes are advantageously provided in the carrier ring or in the pressure disk sections, with the result that the screw connections do not require any nuts or similar counterpieces as separate components, but rather that the use of screws is sufficient to secure the screw connections.

BRIEF DESCRIPTION OF THE DRAWINGS

Further advantages and features of the invention result from the claims and from the following description of one preferred exemplary embodiment of the invention which is shown using the drawings, in which:

DETAILED DESCRIPTION

Figure 1:
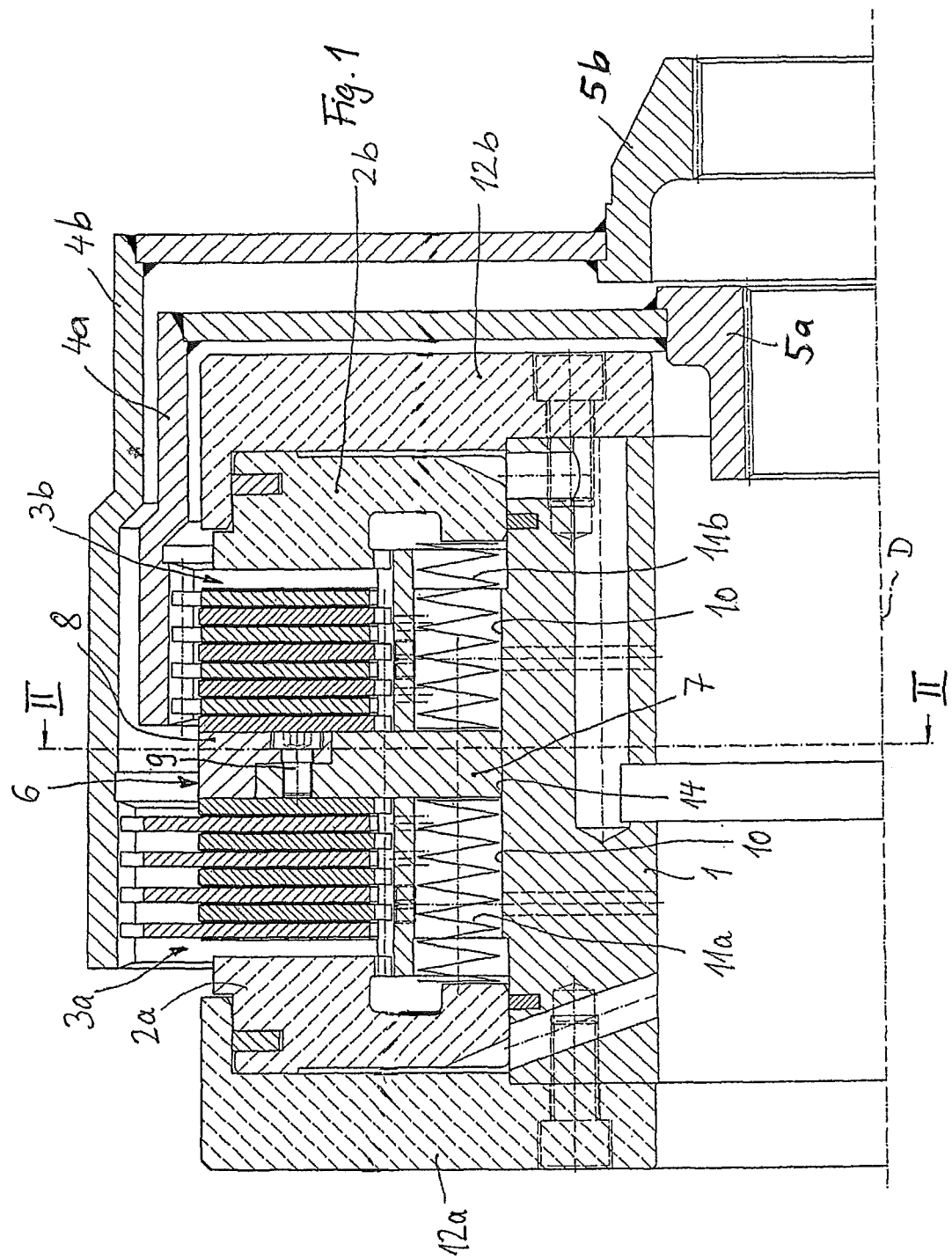
FIG. 1 shows a longitudinal sectional illustration of an upper half of one embodiment of a dual clutch according to the invention.
Figure 2:
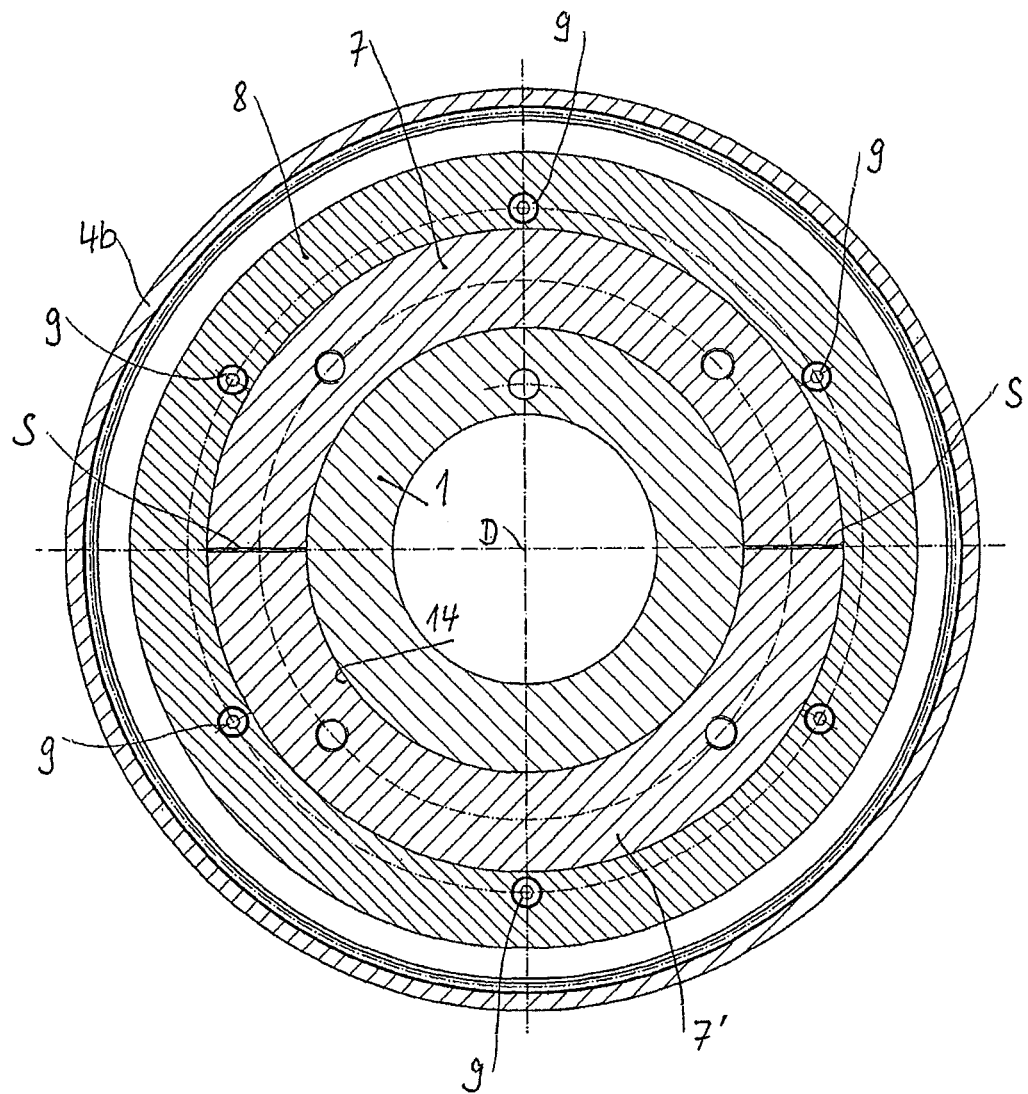
FIG. 2 shows an illustration on a reduced scale of a cross section through the dual clutch according to FIG. 1 along the sectional line II-II in FIG. 1.

A dual clutch according to FIGS. 1 and 2 has a single-piece inner body 1 which is fixed on a shaft (not shown). The inner body 1 including the shaft (not shown) rotates about a clutch rotational axis D during operation of the dual clutch. Two clutch units 3a and 3b which are designed in each case as frictionally or positively acting multiple disk clutches are arranged on the common inner body 1. In order to hold inner disks of the two multiple disk assemblies of both multiple disk clutches in a rotationally fixed but axially movable manner, the inner body 1 is provided on the outside with axial toothing systems which are oriented in an axially parallel manner with respect to the clutch rotational axis D. Each multiple disk assembly has outer disks which are arranged in an axially alternating manner with respect to the inner disks and are provided radially on the outside with external toothing systems for driving in a rotationally fixed but axially movable manner on an inside axial toothing system of in each case one clutch housing 4a, 4b. Both clutch housings 4a and 4b form the clutch outer bodies of the respective clutch unit 3a and 3b, the clutch housing 4a being assigned to the clutch unit 3a and the clutch housing 4b being assigned to the clutch unit 3b. Both clutch housings 4a and 4b have the same axial orientation, the clutch housing 4a overlying the clutch housing 4b on the outside. Accordingly, the multiple disk assembly of the clutch unit 3a is also provided with a greater radial diameter than the multiple disk assembly of the clutch unit 3b. Both clutch housings 4a and 4b are provided on clutch hubs 5a and 5b which adjoin one another axially and are positioned on the axial side next to the inner body 1. The two clutch hubs 5a and 5b have different diameters and are provided for fastening on shafts (not shown) with different diameters. The clutch hub 5a is preferably fastened on a hollow shaft and the clutch hub 5b is held on a shaft which penetrates the hollow shaft coaxially.

In order to load the multiple disk assemblies of the clutch units 3a and 3b with pressure, the clutch unit 3a is assigned a pressure piston 2a and the clutch unit 3b is assigned a pressure piston 2b. The two pressure pistons 2a and 2b are arranged on opposite axial end regions of the inner body 1 such that they can be displaced on said inner body 1. In addition, each pressure piston 2a, 2b is assigned a housing section 12a, 12b which is screwed to the inner body 1 on the respective axial end side and guides and seals the pressure piston 2a radially on the outside. The pressure pistons 2a, 2b are held by compression spring arrangements 11a and 11b in their ventilated positions according to FIG. 1. One compression spring arrangement 11a is assigned to the clutch unit 3a and the other compression spring arrangement 11b is assigned to the clutch unit 3b. Both compression spring arrangements 11a, 11b have a plurality of compression coil springs which are arranged distributed over the circumference of the pressure piston 2a, 2b. The compression coil springs are arranged in cutouts 10 of the inner body 1, which cutouts 10 extend in an axially parallel manner with respect to the clutch rotational axis D from an axial end side of the inner body 1 axially through the entire inner body 1 as far as its axially opposite end side. A plurality of cutouts 10 which are of identical configuration are provided distributed over the circumference of the inner body 1.

The compression coil springs of the compression spring arrangements 11a and 11b are supported axially on the inside on a common pressure disk 6 which is fitted into a radial groove 14 (FIG. 2) of the inner body 1. As can be seen using FIG. 1, the radial groove 14 intersects the cutouts 10 which are configured as through holes, in such a way that a bottom of the radial groove 14 is aligned with a radially inside wall of each cutout or through hole 10. Accordingly, the compression coil springs are supported over the full area on the right-hand or left-hand end face of the pressure disk 6 in the drawing according to FIG. 1.

In order for it to be possible to mount the pressure disk 6 in the radial groove of the inner body 1, the pressure disk 6 has two pressure disk sections 7, 7' which are designed in each case as ring halves. The two ring halves are joined to one another in an abutting manner (designation S in FIG. 2), so that they result in a common pressure disk ring. The two pressure disk sections 7, 7' are connected to one another by a circularly circumferential, single-piece carrier ring 8. To this end, the carrier ring 8 has a radially inwardly projecting fastening flange which is not denoted in greater detail. The pressure disk sections 7, 7' have corresponding, radially outwardly projecting shoulder regions which are provided with threaded holes (FIG. 1). Headed bolts 9 which are countersunk in the fastening flange of the carrier ring 8 can be screwed into said threaded holes. The headed bolts 9 are oriented axially parallel with respect to the clutch rotational axis D and therefore axially. Accordingly, the threaded holes are also provided with axial thread axes.

The invention claimed is:

1. A dual clutch having two clutch units mounted in a rotationally fixed and axially movable manner, in relation to a clutch rotational axis, on a common, single-piece inner body, the dual clutch further including a pressure disk arranged in an axially fixed manner between the clutch units, the pressure disk being held on the inner body and being of a multiple-piece design, the dual clutch having two axially movable pressure pistons, each pressure piston being ventilated by one compression spring arrangement arranged in the inner body, wherein a radial groove is provided in the inner body in which the pressure disk is disposed, the radial groove having a depth which extends radially inwardly at least as far as radially inner wall sections of cutouts defined in the inner body in which the compression spring arrangements are disposed, and each compression spring arrangement comprising a plurality of compression springs having inner ends supported axially on the pressure disk.

2. The dual clutch as claimed in claim 1, wherein the pairs of compression springs of the respective compression spring arrangements are oriented axially opposite one another and the cutouts of axially opposite pairs of compression springs are aligned axially with one another.

3. The dual clutch as claimed in claim 2, wherein all of the cutouts of axially opposite pairs of compression springs are formed as through holes which penetrate the inner body completely axially.

4. The dual clutch as claimed in claim 1, wherein the pressure disk has at least two pressure disk sections which adjoin one another in the circumferential direction and are connected to one another radially on the outside by a single-piece, circumferential carrier ring.

5. The dual clutch as claimed in claim 4, wherein the carrier ring comprises a radially inwardly projecting fastening flange, on which the pressure disk sections are held by axially acting fasteners.

6. The dual clutch as claimed in claim 5, wherein screw connections are provided as the fasteners.

7. The dual clutch as claimed in claim 1, wherein the pressure disk is mounted within said radial groove of said inner body in an axially fixed manner.

8. The dual clutch as claimed in claim 1, wherein the radial groove extends radially inwardly in a direction away from an outer periphery of the inner body so as to intersect the respective cutouts.

9. The dual clutch as claimed in claim 8, wherein the pressure disk has substantially axially oriented and oppositely facing end faces, the compression spring arrangements including opposed pairs of the compression springs disposed in the cutouts of the inner body on opposite sides of the pressure disk and supported axially directly on the respective end faces thereof.

10. The dual clutch as claimed in claim 9, wherein each cutout is a through-opening which extends completely through an axial extent of the inner body, and each opposed pair of compression springs includes two compression springs disposed within a single one of the openings of the inner body, the two compression springs of each opposed pair of compression springs being axially spaced from one another within the one opening by the pressure disk disposed between the two compression springs.

11. The dual clutch as claimed in claim 10, wherein the respective inner ends of each opposed pair of compression springs are supported directly on the corresponding end face of the pressure disk, and respective outer axial ends of each opposed pair of compression springs are disposed to act on the pressure pistons.

12. A dual clutch having two clutch units mounted in a rotationally fixed and axially movable manner, in relation to a clutch rotational axis, on a common, single-piece inner body, the dual clutch further including a pressure disk arranged in an axially fixed manner between the clutch units, the pressure disk being held on the inner body and being of a multiple-piece design, the dual clutch having two axially movable pressure pistons, each pressure piston being ventilated by one compression spring arrangement arranged in the inner body, wherein a radial groove is provided in the inner body which receives the pressure disk, a radial depth of the radial groove extending at least as far as radially inner wall sections of cutouts for the compression spring arrangements, each compression spring arrangement comprising a plurality of compression springs supported axially on the inside on the pressure disk, the cutouts of axially opposite compression springs of the two compression spring arrangements being aligned axially with one another, and all of the cutouts which are aligned axially with one another in the inner body being formed in each case by through holes which penetrate the inner body completely axially.

13. A dual clutch having two clutch units mounted in a rotationally fixed and axially movable manner, in relation to a clutch rotational axis, on a common, single-piece inner body, the dual clutch further including a pressure disk arranged in an axially fixed manner between the clutch units, the pressure disk being held on the inner body and being of a multiple-piece design including at least two pressure disk sections adjoining one another in the circumferential direction and a single-piece circumferential carrier ring, the pressure disk sections being connected to one another radially on the outside by the carrier ring, the dual clutch having two axially movable pressure pistons, each pressure piston being ventilated by one compression spring arrangement arranged in the inner body, wherein a radial groove is provided in the inner body which receives the pressure disk, a radial depth of the radial groove extending at least as far as radially inner wall sections of cutouts for the compression spring arrangements, each compression spring arrangement comprising a plurality of compression springs supported axially on the inside on the pressure disk.

14. A dual clutch defining a clutch rotational axis and comprising:

a single-piece inner body, said inner body defining therein a plurality of openings which extend substantially parallel to the axis and a groove which extends substantially radially relative to the axis and intersects said openings;

a pair of clutch units mounted on said inner body in a rotationally fixed and axially movable manner;

a pressure disk disposed in an axially fixed manner between the respective said clutch units in said groove of said inner body, said pressure disk being of a multiple-piece design and having substantially axially oriented and oppositely facing end faces;

a pair of pressure pistons which are movable axially to act on the respective said clutch units; and a pair of compression spring arrangements disposed on opposite sides of said pressure disk and having opposed pairs of compression springs disposed in said openings of said inner body on opposite sides of said pressure disk and supported axially directly on the respective said end faces thereof.

15. The dual clutch as claimed in claim 14, wherein said inner body has an outer periphery spaced from the axis, and said pressure disk has a radially inner end on which said end faces are defined, said inner end and said end faces thereof being disposed radially inwardly from said outer periphery of said inner body.

16. The dual clutch as claimed in claim 15, wherein each said opening defined in said inner body has an innermost radial extent defined by a surface of said inner body, and said groove extends radially inwardly to the respective said surfaces.

17. The dual clutch as claimed in claim 16, wherein said groove opens through an outer periphery of said inner body and has an innermost radial extent which terminates at each of said surfaces of said inner body.

18. The dual clutch as claimed in claim 14, wherein each said opening is a through-opening which extends completely through an axial extent of said inner body, and each said opposed pair of compression springs includes two compression springs disposed within a single one of said openings of said inner body, said two compression springs of each said opposed pair of compression springs being axially spaced from one another within said one opening by said pressure disk disposed between said two compression springs.

19. The dual clutch as claimed in claim 18, wherein respective inner axial ends of each said opposed pair of compression springs are supported directly on the corresponding said end face of said pressure disk, and respective outer axial ends of each said opposed pair of compression springs are disposed to act on the pressure pistons.

20. The dual clutch as claimed in claim 18, wherein said openings are distributed circumferentially about said inner body, said openings being disposed radially inwardly from an outer periphery of said inner body.

\* \* \* \* \*